Figure 1:
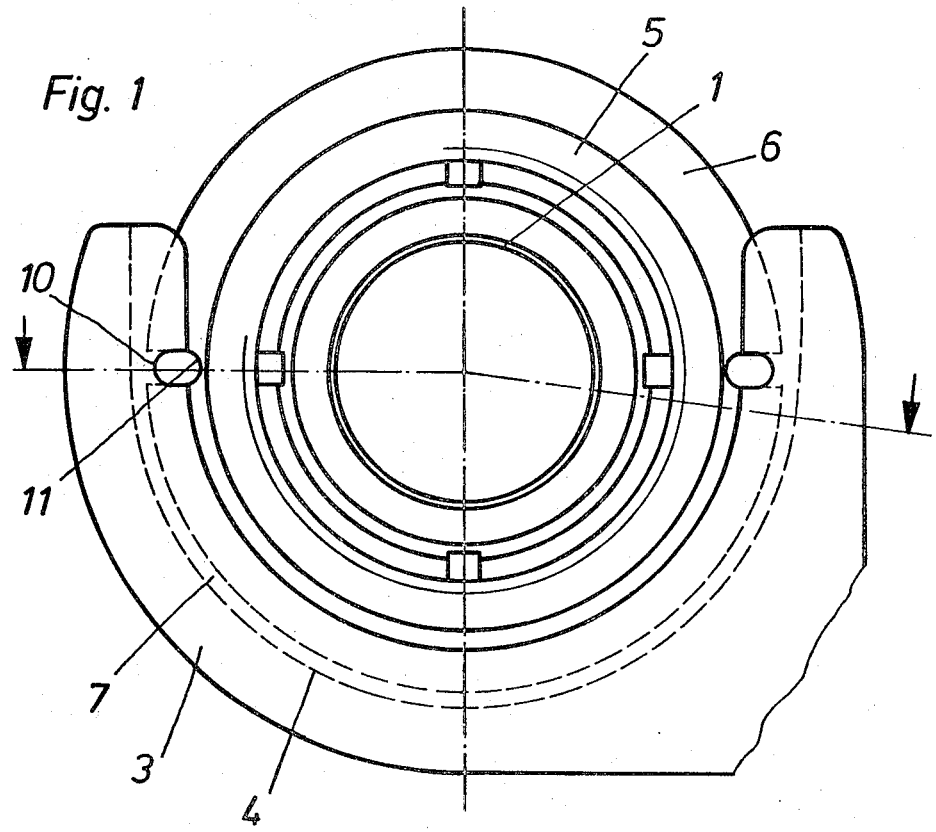

United States Patent [19]
Niedecker

[11] 3,872,543
[45] Mar. 25, 1975

[54] SNUBBING RING AND HOLDER FOR SAUSAGE CASING FILLING MACHINES
[76] Inventor: Herbert Niedecker, Am Ellerhand 6, 6243 Falkenstein (Taunus), Germany
[22] Filed: Jan. 15, 1973
[21] Appl. No.: 323,669

Related U.S. Application Data
[63] Continuation-in-part of Ser. No. 250,129, May 4, 1971, abandoned, which is a continuation-in-part of Ser. No. 132,464, April 8, 1971, Pat. No. 3,748,690.

[30] Foreign Application Priority Data
Jan. 27, 1972 Germany.............................. 2203695

[52] U.S. Cl. .......................................... 17/33, 17/35
[51] Int. Cl. ............................................. A22c 11/00
[58] Field of Search .................................... 17/33, 35

[56] References Cited
UNITED STATES PATENTS
2,999,270  9/1961  Knapp..................................... 17/35
3,140,509  7/1964  Muller..................................... 17/33
FOREIGN PATENTS OR APPLICATIONS
1,187,150  2/1965  Germany ............................... 17/35

Primary Examiner—Robert Peshock
Attorney, Agent, or Firm—Burgess, Dinklage & Sprung

[57] ABSTRACT

In an apparatus for filling a packaging tubing comprising a filling tube about which empty packaging tubing closed at one end is intended to be telescoped, a snubbing ring surrounding said tube and provided with a lip to snub said tubing against said tube as it moves over said tube under the force of filling material supplied to said tubing through said tube, and an element holding said snubbing ring in predetermined longitudinal position along said tube, the improvement which comprises mounting said snubbing ring in said holding element so as to be freely displaceable radially therein, whereby said snubbing ring will freely center itself about said filling tube so that said lip exerts a uniform snubbing action about said tubing. Advantageously the holding element is provided with an annular groove and the snubbing ring with an annular flange seating therein. Aligned slots therebetween can receive pins to prevent rotation.

5 Claims, 2 Drawing Figures

SNUBBING RING AND HOLDER FOR SAUSAGE CASING FILLING MACHINES

This is a continuation-in-part of Application Ser. No. 250,129, filed May 4, 1971, now abandoned, which is a continuation-in-part of Application Ser. No. 132,464, filed Apr. 8, 1971, now U.S. Pat. No. 3,748,690.

This invention relates to improvements in an apparatus for filling sausage casings.

In Application Ser. No. 132,464 there is described an apparatus for filling an endless tubular distensible packaging tubing, i.e., a sausage casing, closed at one end and extending over a filling pipe, the apparatus including means for contricting said filled casing at predetermined time intervals, means for forming two spaced closures at the constriction, and means for severing said casing between said closures. The apparatus is provided with means for releasing additional casing toward said constricting means when the latter are actuated, whereby space is provided to take up filling displaced during said constriction. The release of additional casing is achieved by a snubbing element which bears against the filling pipe with the casing therebetween and which is displaced forwardly during constriction. The forward displacement either pushes additional casing forward or releases the casing slightly so it can be pulled forward by the force of displaced filling during constriction.

In Application Ser. No. 250,129 there is described an improvement in such apparatus comprising a backing member contacting the closed end of said packaging tubing, said backing member being displaceable in longitudinal direction as said packaging tubing is filled, resistance of said backing member to displacement providing a back pressure which ensures complete filling of said packaging tubing. Desirably there is also provided means for alternately raising and lowering the resistance of said backing member during filling of said packaging tubing, thereby increasing the uniformity of the distribution of the filling composition within said packaging tubing. The resistance varying means may include a piston in a cylinder supplied with fluid on one side of the piston, the fluid supply being alternately raised and lowered by means of a valve moving with the backing member and controlled by a cam follower moving on a track. An endless cable may run through and outside the cylinder being fixed to the piston and the backing member so that both move together but in opposite directions.

These devices function quite satisfactorily but changeovers from one size filling spout or tube to another, with affiliated snubbing rings, takes some time. Similarly, the snubbing ring must be moved to position a new length of telescoped casing. The snubbing rings are carried in holders which are locked in the apparatus and which must be carefully aligned relative to the filling spout to ensure uniform snubbing of the sausage casing.

It is accordingly an object of the present invention to provide a way of reducing the time of re-setting the snubbing elements after major dislocations of the snubbing rings.

These and other objects and advantages are realized in accordance with the present invention pursuant to which the snubbing ring and its holder are mounted so as to be freely displaceable in radial direction. In a preferred embodiment, in order to facilitate replacements, the holding device encloses the snubbing ring only partially, thereby making it possible to insert the snubbing ring or the filling spout with the snubbing ring thereabout into the holding device from above without any additional manipulation. The radially displaceable arrangement of the snubbing ring in the holding device is desirably effected by means of an annular groove in the holding device, into which groove the flange of the snubbing ring extends, the dimensions of the groove and flange being such as to allow for some radial clearance. This arrangement, i.e., the provision of free radial movement by means of a groove in the holding device into which the flange of the snubbing ring extends, also guarantees that there will be no axial displacement between holding device and snubbing ring.

The free radial movement of the snubbing element may also be realized by providing the holding device with a guide rail and/or other appropriate attachment.

The arrangement of the snubbing ring in the holding device according to the invention allows the snubbing ring to center itself around the filling spout. This results in the snubbing force being exerted uniformaly about the entire circumference of the casing moving over the filling pipe, without an adjustment being necessary in each individual case. Even if the string of a pre-tied tubing section moves between the filling pipe and the snubbing ring so that there is the danger of an uneven snubbing action, this danger is reduced by the self-centering adjustment of the snubbing ring and once the string passes the device will again adjust itself. In addition thereto, replacement of the snubbing ring does not require a new adjustment; rather, the snubbing ring adopts automatically the correct central position with respect to the filling pipe.

Figure 2:
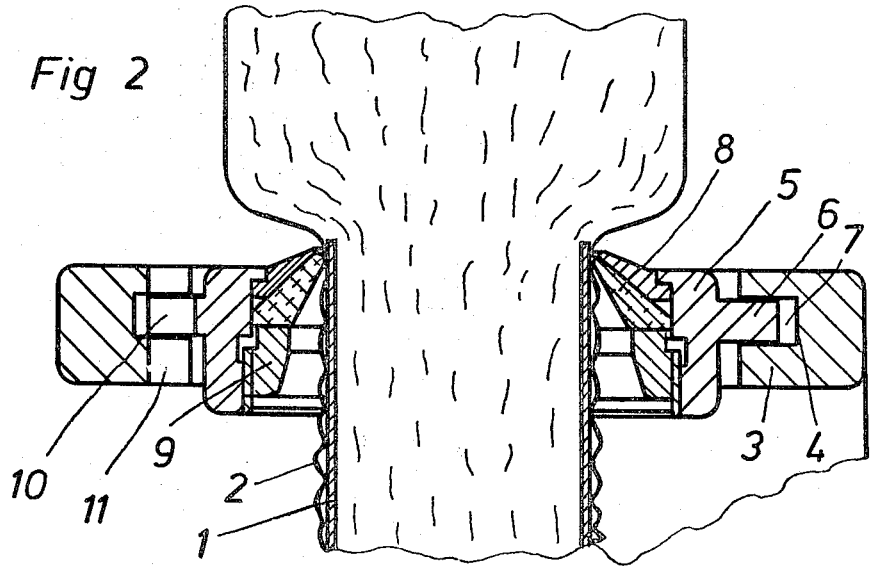

The invention is further described in the accompanying drawing, wherein:

FIG. 1 is a lateral elevation looking into the filling pipe with holding device and self-centering snubbing ring; and FIG. 2 is a longitudinal section through the filling pipe with holding device and self-centering snubbing ring.

Referring now more particularly to the drawing, thre is shown a holding device 3, which is connected with the filling machine, arranged about a filling pipe 1 onto which a sausage casing to be filled 2 is telescoped. The holding device 3 has an annular groove 4. The annular snubbing element or ring 5 has a flange 6 which extends into groove 4. The clearance 7 between holding device 3 and flange 6 of the snubbing ring 5 allows the snubbing ring 5 to move freely in a radial direction, i.e., laterally as seen in the drawing, in the holding device 3 in spite of being locked against longitudinal, i.e., axial, movement by the groove. By means of the resilient snubbing lip 8 the snubbing ring 5 presses against the sausage casing 2 and thereby guarantees that the sausage casing is pulled off evenly during the filling operation. The snubbing force may be varied by means of a threaded nut 9. The holding device 3 and the flange 6 of the snubbing ring 5 are provided with open aligned slots 10, 11 into which pins or keys may be set so as to prevent rotation of the snubbing ring 5 which might otherwise occur, especially during rotation of nut 9.

It will be appreciated that the instant specification and examples are set forth by way of illustration and not limitation and that various modifications and changes may be made without departing from the spirit and scope of the present invention.

What is claimed is:

1. In an apparatus for filling a packaging tubing comprising a filling tube about which empty packaging tubing closed at one end is intended to be telescoped, a snubbing ring surrounding said tube and provided with a lip to snub said tubing against said tube as it moves over said tube under the force of filling material supplied to said tubing through said tube, and an element holding said snubbing ring in predetermined longitudinal position along said tube, the improvement which comprises providing said holding element and said snubbing ring with an annular engaging groove and flange with radial clearance therebetween, said snubbing ring thus being held against longitudinal displacement but being capable of radial displacement, whereby said snubbing ring will freely center itself about said filling tube so that said lip exerts a uniform snubbing action about said tubing.

2. An apparatus according to claim 1, including keying means to prevent rotational movement of said snubbing ring relative to said holding element.

3. An apparatus according to claim 1, wherein said holding element embraces said snubbing ring only about a portion of its circumference thereby to facilitate replacement.

4. An apparatus according to claim 3, wherein said holding element is upwardly open so that said snubbing ring can be lifted out from above.

5. An apparatus according to claim 2, wherein said holding element is upwardly open so that said snubbing ring can be lifted out from above.

* * * * *